US012439393B2

(12) United States Patent
Ji et al.

(10) Patent No.: US 12,439,393 B2
(45) Date of Patent: Oct. 7, 2025

(54) INDICATING AN AVAILABILITY OF A TRACKING REFERENCE SIGNAL (TRS) ASSOCIATED WITH A SUBSET OF TRS RESOURCE SETS

(71) Applicant: QUALCOMM Incorporated, San Diego, CA (US)

(72) Inventors: Lianghai Ji, San Diego, CA (US); Huilin Xu, Temecula, CA (US); Jun Ma, San Diego, CA (US); Qiang Wu, San Diego, CA (US); Mohamad Sayed Hassan, Paris (FR); Liangping Ma, San Diego, CA (US); Mehmet Izzet Gurelli, San Diego, CA (US); Weimin Duan, San Diego, CA (US); Karthik Anantha Swamy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 719 days.

(21) Appl. No.: 17/806,884

(22) Filed: Jun. 14, 2022

(65) Prior Publication Data
US 2023/0403691 A1  Dec. 14, 2023

(51) Int. Cl.
*H04W 72/04* (2023.01)
*H04L 5/00* (2006.01)
*H04W 72/044* (2023.01)
*H04W 72/23* (2023.01)

(52) U.S. Cl.
CPC ......... *H04W 72/046* (2013.01); *H04L 5/0051* (2013.01); *H04W 72/23* (2023.01)

(58) Field of Classification Search
CPC .. H04W 72/046; H04W 72/23; H04L 5/0051; H04L 5/0023; H04L 5/0048; H04L 5/0094
See application file for complete search history.

(56) References Cited

U.S. PATENT DOCUMENTS

| 11,621,815 | B1* | 4/2023 | Xu | H04L 5/0048 |
| | | | | 370/329 |
| 2019/0165880 | A1* | 5/2019 | Hakola | H04L 1/1854 |
| 2023/0246777 | A1* | 8/2023 | Paz | H04L 5/0051 |
| | | | | 370/328 |
| 2024/0057166 | A1* | 2/2024 | Yao | H04W 74/0833 |
| 2024/0187988 | A1* | 6/2024 | Maleki | H04W 52/0216 |
| 2024/0235785 | A1* | 7/2024 | Maleki | H04L 5/0048 |

* cited by examiner

*Primary Examiner* — Abdullahi E Salad
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, an indication of a subset of tracking reference signal (TRS) resource sets from a plurality of TRS resource sets. The UE may receive, from the network node, a TRS availability indication bitmap that indicates an availability of a TRS associated with the subset of TRS resource sets. The UE may determine that the TRS is available based at least in part on the TRS availability indication bitmap. The UE may receive, from the network node, the TRS based at least in part on the TRS availability indication bitmap indicating that the TRS is available. Numerous other aspects are described.

30 Claims, 12 Drawing Sheets

INDICATING AN AVAILABILITY OF A TRACKING REFERENCE SIGNAL (TRS) ASSOCIATED WITH A SUBSET OF TRS RESOURCE SETS

FIELD OF THE DISCLOSURE

Aspects of the present disclosure generally relate to wireless communication and to techniques and apparatuses for indicating an availability of a tracking reference signal (TRS) associated with a subset of TRS resource sets.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive, from a network node, an indication of a subset of tracking reference signal (TRS) resource sets from a plurality of TRS resource sets; receive, from the network node, a TRS availability indication bitmap that indicates an availability of a TRS associated with the subset of TRS resource sets; determine that the TRS is available based at least in part on the TRS availability indication bitmap; and receive, from the network node, the TRS based at least in part on the TRS availability indication bitmap indicating that the TRS is available.

In some implementations, an apparatus for wireless communication at a network node includes a memory and one or more processors, coupled to the memory, configured to: transmit, to a UE, an indication of a subset of TRS resource sets from a plurality of TRS resource sets; transmit, to the UE, a TRS availability indication bitmap that indicates an availability of a TRS associated with the subset of TRS resource sets; and transmit, to the UE, the TRS based at least in part on the TRS availability indication bitmap indicating that the TRS is available.

In some implementations, a method of wireless communication performed by a UE includes receiving, from a network node, an indication of a subset of TRS resource sets from a plurality of TRS resource sets; receiving, from the network node, a TRS availability indication bitmap that indicates an availability of a TRS associated with the subset of TRS resource sets; determining that the TRS is available based at least in part on the TRS availability indication bitmap; and receiving, from the network node, the TRS based at least in part on the TRS availability indication bitmap indicating that the TRS is available.

In some implementations, a method of wireless communication performed by a network node includes transmitting, to a UE, an indication of a subset of TRS resource sets from a plurality of TRS resource sets; transmitting, to the UE, a TRS availability indication bitmap that indicates an availability of a TRS associated with the subset of TRS resource sets; and transmitting, to the UE, the TRS based at least in part on the TRS availability indication bitmap indicating that the TRS is available.

In some implementations, a non-transitory computer-readable medium storing a set of instructions for wireless communication includes one or more instructions that, when executed by one or more processors of a UE, cause the UE to: receive, from a network node, an indication of a subset of TRS resource sets from a plurality of TRS resource sets; receive, from the network node, a TRS availability indication bitmap that indicates an availability of a TRS associated with the subset of TRS resource sets; determine that the TRS is available based at least in part on the TRS availability indication bitmap; and receive, from the network node, the TRS based at least in part on the TRS availability indication bitmap indicating that the TRS is available.

In some implementations, a non-transitory computer-readable medium storing a set of instructions for wireless communication includes one or more instructions that, when executed by one or more processors of a network node, cause the network node to: transmit, to a UE, an indication of a subset of TRS resource sets from a plurality of TRS resource sets; transmit, to the UE, a TRS availability indication bitmap that indicates an availability of a TRS associated with the subset of TRS resource sets; and transmit, to the UE, the TRS based at least in part on the TRS availability indication bitmap indicating that the TRS is available.

In some implementations, an apparatus for wireless communication includes means for receiving, from a network node, an indication of a subset of TRS resource sets from a plurality of TRS resource sets; means for receiving, from the network node, a TRS availability indication bitmap that indicates an availability of a TRS associated with the subset of TRS resource sets; means for determining that the TRS is available based at least in part on the TRS availability indication bitmap; and means for receiving, from the network node, the TRS based at least in part on the TRS availability indication bitmap indicating that the TRS is available.

In some implementations, an apparatus for wireless communication includes means for transmitting, to a UE, an indication of a subset of TRS resource sets from a plurality of TRS resource sets; means for transmitting, to the UE, a TRS availability indication bitmap that indicates an availability of a TRS associated with the subset of TRS resource sets; and means for transmitting, to the UE, the TRS based at least in part on the TRS availability indication bitmap indicating that the TRS is available.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
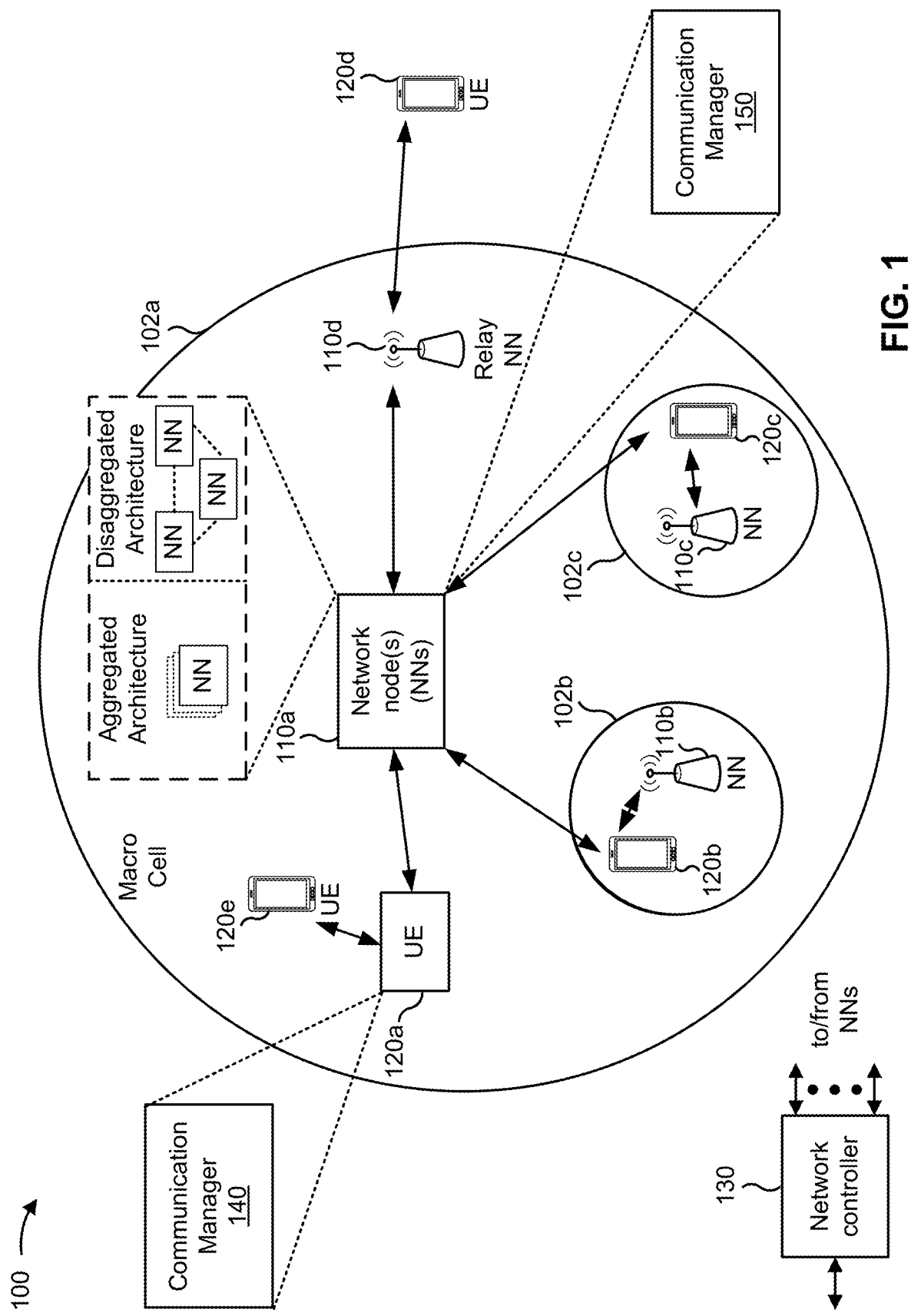
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a network node, an indication of a subset of tracking reference signal (TRS) resource sets from a plurality of TRS resource sets; receive, from the network node, a TRS availability indication bitmap that indicates an availability of a TRS associated with the subset of TRS resource sets; determine that the TRS is available based at least in part on the TRS availability indication bitmap; and receive, from the network node, the TRS based at least in part on the TRS availability indication bitmap indicating that the TRS is available. Additionally, or alternatively, the communication manager 140 may perform one or more other operations described herein.

In some aspects, a network node (e.g., network node 110) may include a communication manager 150. As described in more detail elsewhere herein, the communication manager 150 may transmit, to a UE, an indication of a subset of TRS resource sets from a plurality of TRS resource sets; transmit, to the UE, a TRS availability indication bitmap that indicates an availability of a TRS associated with the subset of TRS resource sets; and transmit, to the UE, the TRS based at least in part on the TRS availability indication bitmap indicating that the TRS is available. Additionally, or alternatively, the communication manager 150 may perform one or more other operations described herein.

As indicated above, FIG. 1 is provided as an example. Other examples may differ from what is described with regard to FIG. 1.

Figure 2:
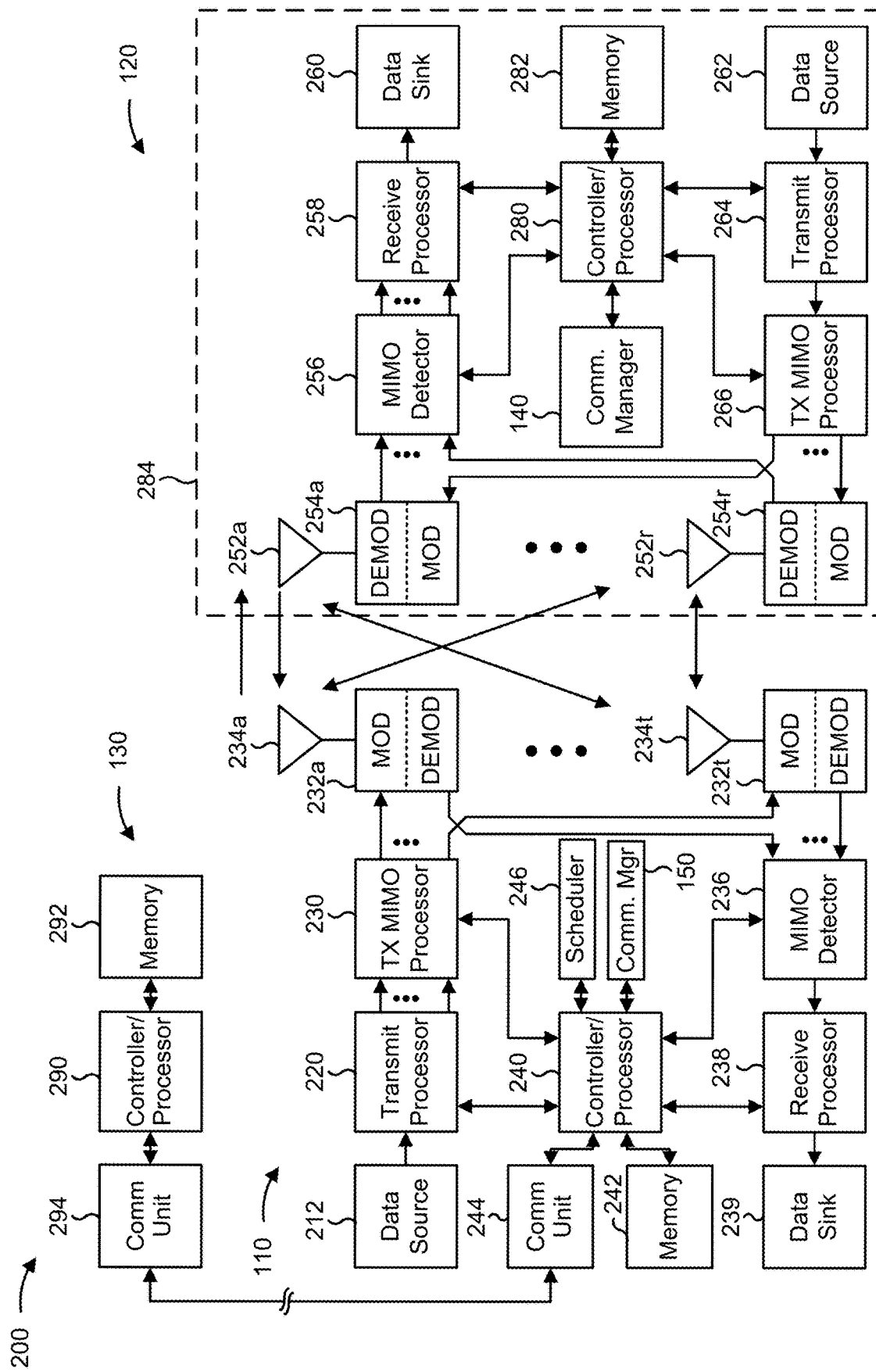
FIG. 2 is a diagram illustrating an example of a network node in communication with a user equipment (UE) in a wireless network, in accordance with the present disclosure.

FIG. 2 is a diagram illustrating an example 200 of a network node 110 in communication with a user equipment (UE) 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MC S(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-12).

The controller/processor 240 of the network node 110, the controller/processor 280 of the UE 120, and/or any other component(s) of FIG. 2 may perform one or more techniques associated with indicating an availability of a TRS associated with a subset of TRS resource sets, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network node, an indication of a subset of TRS resource sets from a plurality of TRS resource sets; means for receiving, from the network node, a TRS availability indication bitmap that indicates an availability of a TRS associated with the subset of TRS resource sets; means for determining that the TRS is available based at least in part on the TRS availability indication bitmap; and/or means for receiving, from the network node, the TRS based at least in part on the TRS availability indication bitmap indicating that the TRS is available. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., network node 110) includes means for transmitting, to a UE, an indication of a subset of TRS resource sets from a plurality of TRS resource sets; means for transmitting, to the UE, a TRS availability indication bitmap that indicates an availability of a TRS associated with the subset of TRS resource sets; and/or means for transmitting, to the UE, the TRS based at least in part on the TRS availability indication bitmap indicating that the TRS is available. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
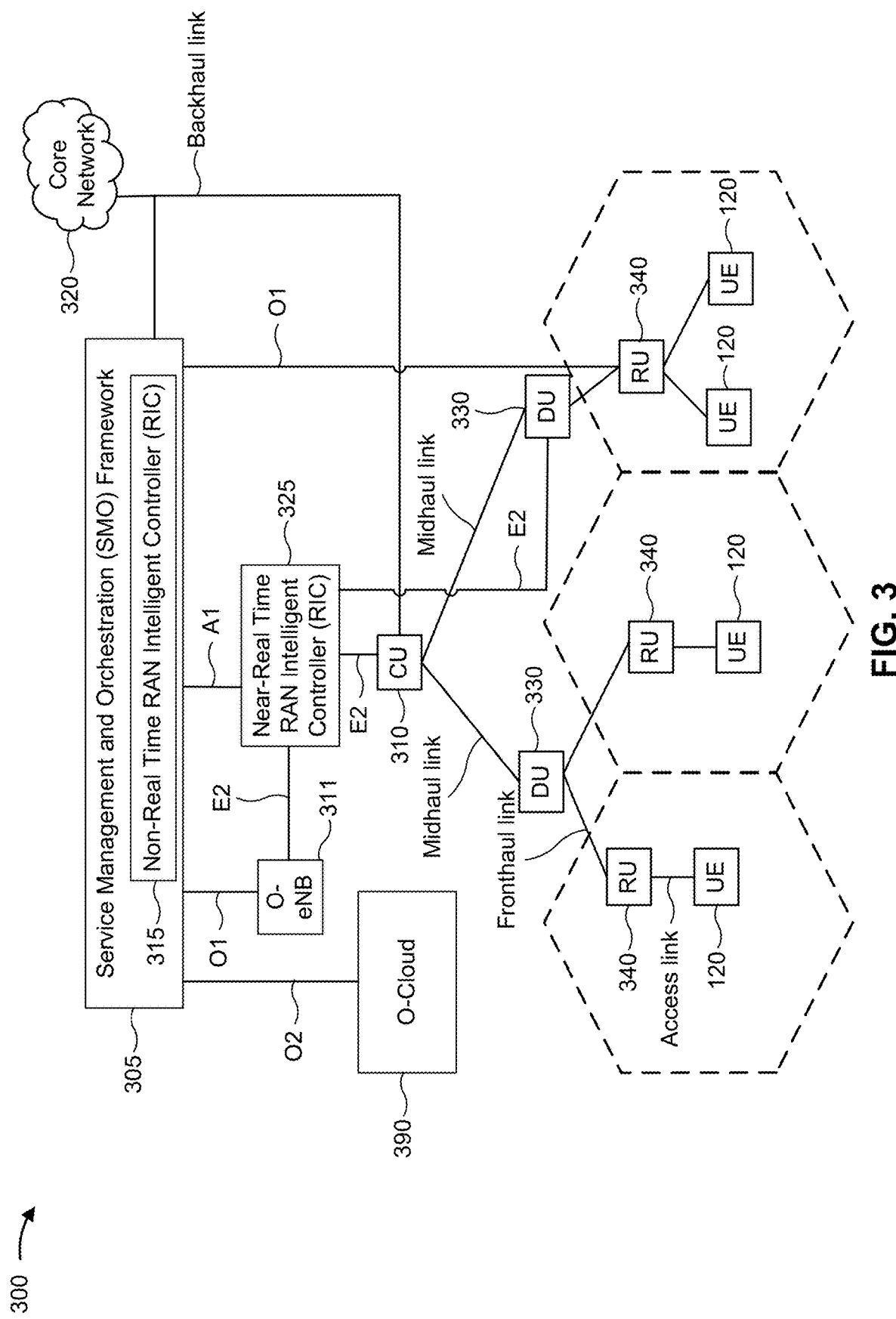
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

A non-terrestrial network (NTN) may provide service coverage to areas in which a terrestrial cellular service is not available. A UE may connect over the air to a satellite, or another type of NTN device, such as a balloon or a drone. A wireless channel of the NTN may be associated with a strong line of sight (LOS), unlike in a terrestrial network. A signal associated with the NTN may be reflected to the sky, instead of traveling over a ground surface, as in the terrestrial network. In the NTN, footprints of different beams that are radiated from the satellite may be associated with a clear boundary. The UE may typically only receive the signal from one beam of the satellite, except around the boundary of two beams. The UE may receive the signal from a beam (e.g., a satellite beam) in a predictable manner.

Figure 4:
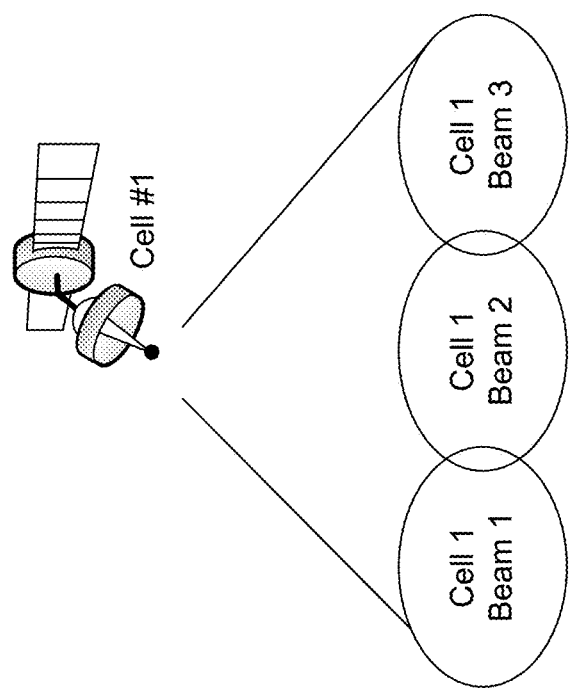
FIG. 4 is a diagram illustrating an example of a non-terrestrial network (NTN) deployment, in accordance with the present disclosure.

FIG. 4 is a diagram illustrating an example 400 of an NTN deployment, in accordance with the present disclosure.

As shown in FIG. 4, in the NTN deployment, a satellite may provide service coverage to a cell. The satellite may apply multiple beams in the cell to cover a serving area. The satellite may provide a first beam, a second beam, and a third beam. The first beam may be associated with a first footprint, the second beam may be associated with a second footprint, and the third beam may be associated with a third footprint. The first footprint, the second footprint, and the third footprint may be associated with relatively clear boundaries.

As indicated above, FIG. 4 is provided as an example. Other examples may differ from what is described with regard to FIG. 4.

Some paging enhancement features may support improved UE power saving. In one such enhancement, TRS occasion(s) for radio resource control (RRC) connected state UEs may be shared with RRC idle/inactive state UEs. A network node may transmit, to the RRC idle/inactive state UEs, a system information block (SIB) that indicates a TRS resource set configuration. The TRS resource set configuration may configure up to 64 TRS resource sets. The network node may also indicate, to the RRC idle/inactive state UEs, an availability of configured TRSs (e.g., TRS occasions) using layer-1 (L1) signaling. For example, the network node may indicate the availability of configured TRSs in a paging early indication (PEI) and/or a paging physical downlink control channel (PDCCH), in order to dynamically switch on/off a TRS transmission/configuration. The RRC idle/inactive state UEs may use the indication of the available configured TRSs (or TRS occasions), as shared by the network node, to perform various functionalities, such as automatic gain control (AGC) and/or time/frequency tracking.

Figure 5:
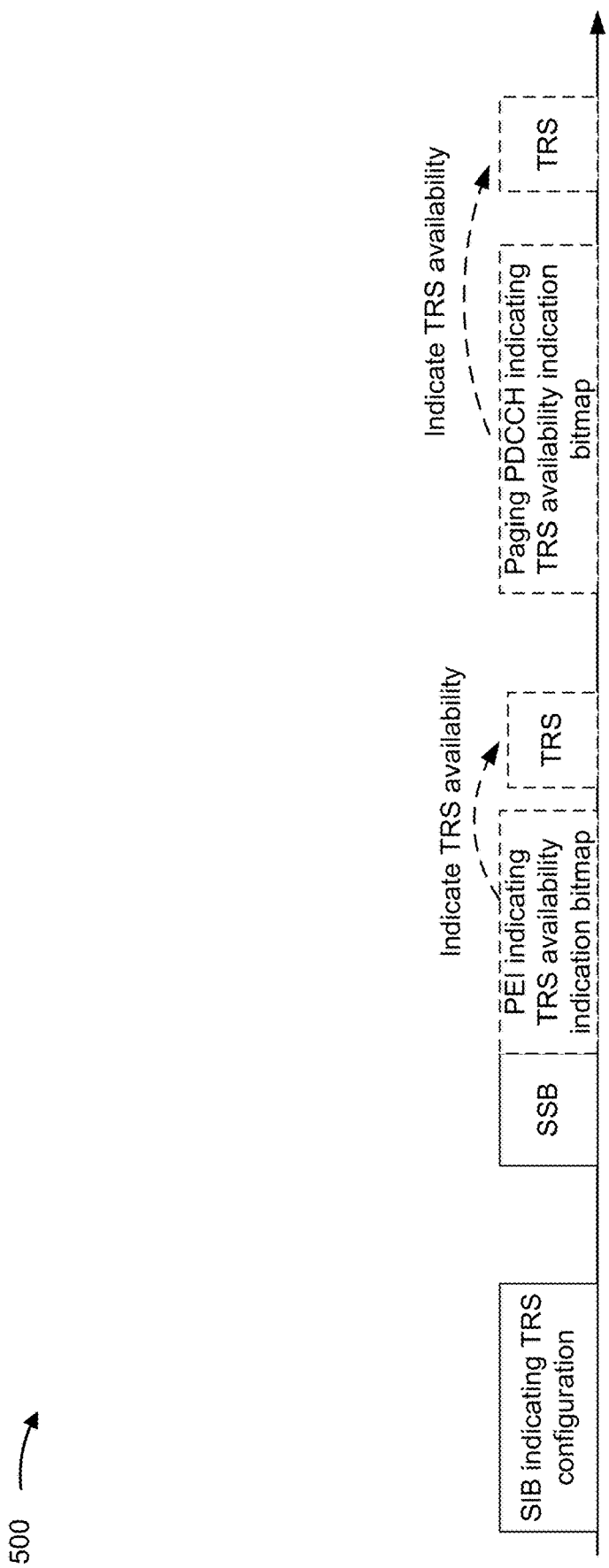
FIG. 5 is a diagram illustrating an example of indicating a tracking reference signal (TRS) availability, in accordance with the present disclosure.

FIG. 5 is a diagram illustrating an example 500 of indicating a TRS availability, in accordance with the present disclosure.

As shown in FIG. 5, a network node may transmit a SIB that indicates a TRS resource set configuration. The network node may transmit a synchronization signal block (SSB). The network node may transmit a PEI and/or a paging PDCCH, each indicating a TRS availability indication bitmap. The TRS availability indication bitmap may indicate a TRS availability (or TRS occasion). The network node may transmit a TRS based at least in part on the TRS availability indication bitmap. In other words, the network node may transmit the TRS resource set configuration in the SIB, and afterwards, the network node may use the PEI and/or the paging PDCCH to indicate, to RRC idle/inactive state UEs, availability information of a TRS configured in the SIB. The PEI and/or the paging PDCCH may indicate the TRS occasion, which may be associated with an available TRS that is configured in the SIB.

As indicated above, FIG. 5 is provided as an example. Other examples may differ from what is described with regard to FIG. 5.

In a TRS design for RRC idle/inactive UEs, a TRS availability indication bitmap, as relayed in a PEI and/or a paging PDCCH, may be used as an L1 indication for dynamically switching on/off a TRS transmission/configuration. The TRS availability indication bitmap may include up to six bits, where the six bits may correspond to a quantity of reserved bits in the paging PDCCH. A TRS resource set configuration transmitted in a SIB may provide a group identifier (ID), where a group ID value i may map to a bit i in the TRS availability indication bitmap. Multiple TRS resource sets may be configured with the same group ID. In this example, up to 64 TRS resource sets may be configured within up to six groups in the SIB.

A network node may transmit, in the SIB, the same TRS resource set configuration via a plurality of different beams (e.g., all of the different beams). The network node may transmit, in L1 signaling, the same TRS availability indication bitmap via the plurality of different beams. A UE may need to be aware of the TRSs transmitted by the network node with the plurality of different beams. Transmitting the same information with the plurality of different beams may be reasonable in a terrestrial network, since the UE may experience frequency beam switches, and signals from any beam may reach the UE due to reflection.

Figure 6:
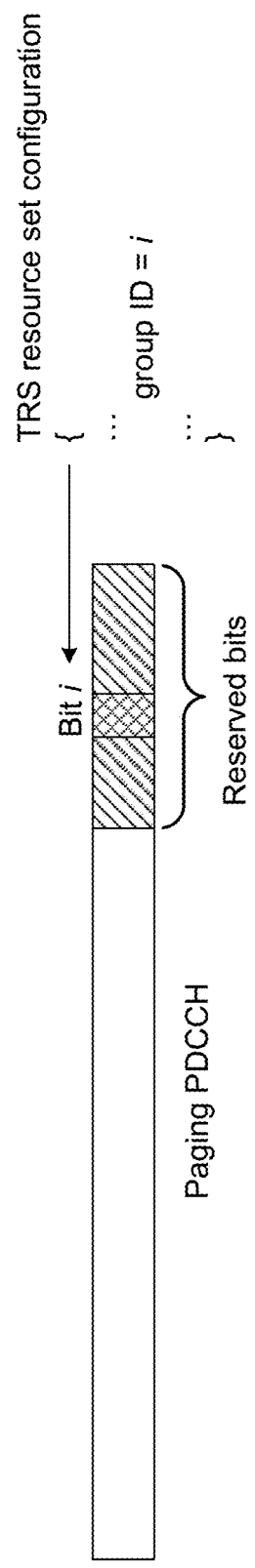
FIG. 6 is a diagram illustrating an example of transmitting a TRS availability indication bitmap, in accordance with the present disclosure.

FIG. 6 is a diagram illustrating an example 600 of transmitting a TRS availability indication bitmap, in accordance with the present disclosure.

As shown in FIG. 6, a network node may transmit a paging PDCCH. Reserved bits in the paging PDCCH may be used to indicate the TRS availability indication bitmap. A bit i, of the paging PDCCH, may be used to indicate whether TRSs (or a single TRS) associated with a group ID i are available for RRC idle/inactive UEs, where the group ID i may be indicated in a TRS resource set configuration in a SIB.

Alternatively, the TRS availability indication bitmap may be transmitted in a PEI (not shown in FIG. 6). In this case, reserved bits in the PEI may be used to indicate the TRS availability indication bitmap. A bit i, of the PEI, may be used to indicate whether TRSs associated with a group ID i are available for RRC idle/inactive UEs, where the group ID i may be indicated in a TRS resource set configuration.

As indicated above, FIG. 6 is provided as an example. Other examples may differ from what is described with regard to FIG. 6.

Although a SIB may configure up to 64 TRS resource sets, a network node may only indicate a TRS availability on a per-resource-set-group basis, since only six bits may be used in a TRS availability indication bitmap, which does not provide flexibility. As an example, multiple TRS resource sets may be associated with the same group. For the network node to indicate that one of the associated TRS resource sets is available for RRC idle/inactive UEs, the network node needs to ensure that all of the TRS resources in that group are transmitted. When the TRS availability indication bitmap indicates that a group of TRS resources is available, but one of the associated TRS resources in that group is not transmitted, an RRC idle/inactive UE may use an undesired signal/noise to perform a function, such as AGC or time-and-frequency tracking. When some of the associated TRS resources in that group are not transmitted while some others of the associated TRS resources in that group are actually transmitted, the TRS availability indication bitmap may indicate that a group of TRS resources is unavailable, but in this case, the RRC idle/inactive UE may be unable to use the transmitted TRSs to perform the function. Thus, a mechanism for the network node in an NTN to indicate a TRS availability with improved flexibility is needed.

In various aspects of techniques and apparatuses described herein, a UE may receive, from a network node via a SIB, a TRS resource set configuration that indicates a plurality of TRS resource sets, where the plurality of TRS resource sets may be associated with a plurality of beams in a cell. The UE may receive, from the network node, an indication of a subset of TRS resource sets from the plurality of TRS resource sets. The UE may receive, from the network node, a TRS availability indication bitmap that indicates an availability of a TRS associated with the subset of TRS resource sets. The UE may determine that the TRS is available based at least in part on the TRS availability indication bitmap. The UE may determine that the TRS is available based at least in part on the TRS availability indication bitmap, where a bit in the TRS availability indication bitmap may indicate that the TRS is available (or that one or multiple TRSs associated with the subset of TRS resource sets are available). The UE may receive, from the network node, the TRS based at least in part on the TRS availability indication bitmap indicating that the TRS is available. The UE may perform a function using the TRS received from the network node, where the function may include an AGC and/or a time/frequency tracking.

In some aspects, the network node may configure the UE with only the subset of TRS resource sets relevant for the UE. The network entity may transmit, to the UE, the TRS availability indication bitmap, which may indicate a TRS availability from only the subset of TRS resource sets. The network node may indicate, via the TRS availability indication bitmap, available TRSs associated with the subset of TRS resource sets. The available TRSs may be transmitted using a subset of beams (e.g., satellite beams) relevant for the UE. The network node may indicate the available TRSs using a finer granularity, which may provide a better configuration flexibility. The finer granularity and the better configuration flexibility may allow RRC idle/inactive UEs to use a larger quantity of TRSs for its radio functions, such as AGC and/or time-and-frequency tracking. The RRC idle/inactive UEs may be able to synchronize with the network node in a faster manner, and the RRC idle/inactive UEs may be able to stay in a power saving mode for a longer period of time, which may improve a UE power consumption.

Figure 7:
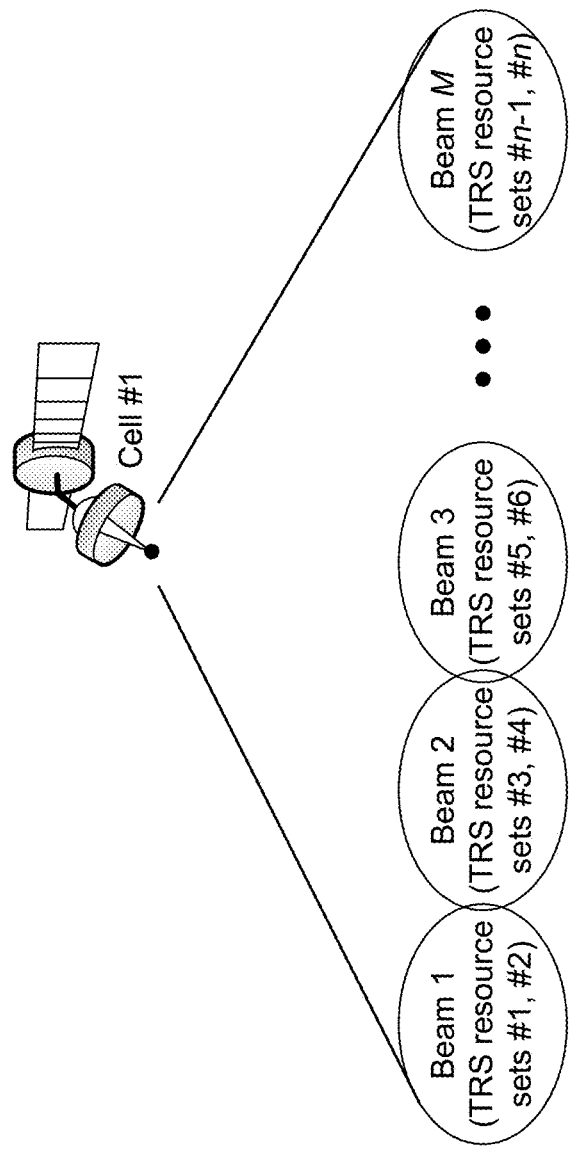
FIGS. 7-8 are diagrams illustrating examples associated with indicating an availability of a TRS associated with a subset of TRS resource sets, in accordance with the present disclosure.

FIG. 7 is a diagram illustrating an example 700 associated with indicating an availability of a TRS associated with a subset of TRS resource sets, in accordance with the present disclosure.

As shown in FIG. 7, in an NTN deployment, a network node (e.g., a satellite) may reserve/use different TRS resource sets for different beams. The network node may provide service coverage to a cell. The network node may apply multiple beams, e.g. SSB beams and/or channel state information reference signal (CSI-RS) beams, in the cell to cover a serving area. The network node may apply a first beam, a second beam, a third beam, and an M-th beam. The first beam may be associated with a first TRS resource set (e.g., TRS resource sets #1 and #2). The second beam may be associated with a second TRS resource set (e.g., TRS resource sets #3 and #4). The third beam may be associated with a third TRS resource set (e.g., TRS resource sets #5 and #6). The M-th beam may be associated with an M-th TRS resource set (e.g., TRS resource sets #M−1 and #M). In one example, if a beam is associated with a TRS resource set, the network node may transmit the TRS in the associated beam, e.g. an SSB/CSI-RS beam.

In some aspects, a first UE may be served by the first beam, and the first UE may be configured with the first TRS resource set. A second UE may be served by the second beam, and the second UE may be configured with the second TRS resource set. Thus, the first UE and the second UE may be served by different beams, and the first UE and the second UE may be configured with different TRS resource sets.

As indicated above, FIG. 7 is provided as an example. Other examples may differ from what is described with regard to FIG. 7.

Figure 8:
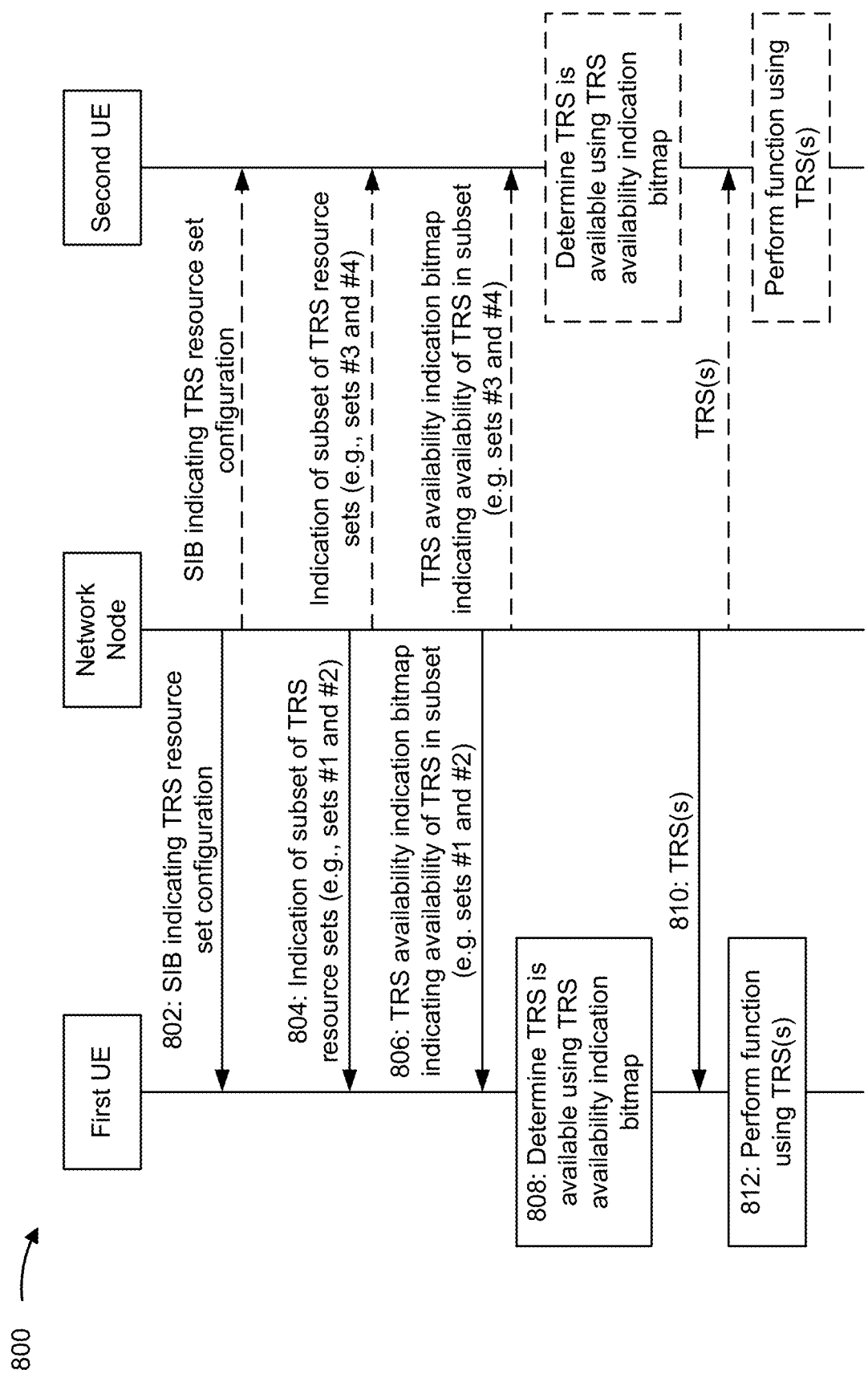

FIG. 8 is a diagram illustrating an example 800 associated with indicating an availability of a TRS associated with a subset of TRS resource sets, in accordance with the present disclosure. As shown in FIG. 8, example 800 includes communication between a first UE (e.g., UE 120*a*), a second UE (e.g., UE 120*e*), and a network node (e.g., network node 110). In some aspects, the first UE, the second UE, and the network node may be included in a wireless network, such as wireless network 100.

In some aspects, the first UE and the second UE may be under different beam footprints. The first UE may be served by a first beam, and the second UE may be served by a second beam. As described in further detail herein, the first UE and the second UE may be configured with different subsets of a TRS resource set configuration, where a TRS availability indication bitmap (e.g., an L1 TRS availability indication bitmap) may only indicate an availability of TRSs associated with a configured subset of the TRS resource set configuration. The first UE and the second UE may be RRC idle/inactive UEs.

As shown by reference number 802, the first UE (and optionally, the second UE) may optionally receive, from the network node and via a SIB, the TRS resource set configuration. The TRS resource set configuration may indicate a plurality of TRS resource sets. The plurality of TRS resource sets may be associated with a plurality of beams in a cell. The plurality of TRS resource sets may be all possible TRS resource sets for all possible beams used by the network node.

As shown by reference number 804, the first UE (and optionally, the second UE) may receive, from the network node, an indication of a subset of TRS resource sets from the plurality of TRS resource sets. A TRS resource set of the subset of TRS resource sets may be associated with an ID, where a quantity of IDs may satisfy a threshold. In some cases, the ID may be a group ID. The first UE may determine the subset of TRS resource sets based at least in part on the indication received from the network node. The subset of TRS resources may be based at least in part on a serving beam, of the UE, and the plurality of TRS resource sets associated with the plurality of beams in the cell.

In some aspects, the first UE may be configured with the subset of TRS resource sets, which may be a subset of all possible TRS resource sets used by the network node. The subset of TRS resource sets may be configured by the network node, or determined by the first UE, based at least in part on the indication received from the network node.

As an example, the network node may have a configuration or reservation of N total TRS resource sets used in different beams of the cell. The first UE may only be configured with the subset of TRS resource sets (e.g., M) of the N total TRS resource sets, where M is less than N. Although other (N-M) TRS resource sets may not be configured for the first UE, the other (N-M) TRS resource sets may be configured by the network node to other RRC idle/inactive UEs, such as the second UE. The other RRC idle/inactive UEs may be served by other beam(s). Further, each of the M TRS resource sets at the first UE may be associated with a (group) ID, where the quantity of (group) IDs may satisfy (e.g., be smaller or equal to) a threshold (e.g., a value of six).

As an example, the first UE may receive, from the network node, a first indication of a first subset of TRS resource sets from the plurality of TRS resource sets. The first subset of TRS resource sets may correspond to resource set #1 and resource set #2. The first subset of TRS resource sets may be associated with the first beam. The second UE may receive, from the network node, a second indication of a second subset of TRS resource sets from the plurality of TRS resource sets. The second subset of TRS resource sets may correspond to resource set #3 and resource set #4. The second subset of TRS resource sets may be associated with the second beam. Thus, the first UE and the second UE may be configured with different subsets of TRS resource sets. The first UE may not be configured with the second subset of TRS resource sets, and the second UE may not be configured with the first subset of TRS resource sets.

In some aspects, the first UE may receive, from the network node, the SIB indicating the TRS resource set configuration and the indication of the subset of TRS resource sets in two different messages. In some aspects, the first UE may receive, from the network node, the SIB indicating the TRS resource set configuration and the indication of the subset of TRS resource sets in in a single message.

In some aspects, the first UE may receive, from the network node, the indication of the subset of TRS resource sets via a beam that is relevant for the first UE. The beam may be the serving beam, a camping beam, or a neighbor beam, where the beam may be a satellite beam, e.g., a satellite beam used to transmit an SSB and/or a CSI-RS. The subset of TRS resource sets may be based at least in part on one or multiple beams that are associated with the UE, where the one or multiple beams may contain a serving beam of the UE, a camping beam of the UE, one or multiple neighbor beams of the serving beam, and/or one or multiple neighbor beams of the camping beam. In some aspects, the network node may transmit different subsets of TRS resource sets by using different beams. Only TRSs transmitted in the beams relevant for the first UE may be contained in the subset of TRS resource sets (e.g., the first UE's serving/camping beam and/or neighbor beams around the serving/camping beam). Different UEs (e.g., UEs served by different beams) may be configured with different subsets of TRS resource sets.

In some aspects, the first UE may receive, from the network node via the serving beam associated with the first UE, a SIB that indicates the subset of TRS resource sets. The SIB may be specific to the serving beam associated with the first UE, and the SIB may not be associated with non-serving beams of the first UE. In some aspects, the network node may indicate different subsets of TRS resource sets by transmitting different SIB contents using different beams. For example, the network node may transmit a first SIB using a first beam and a second SIB using a second beam, where the first SIB may configure a different subset of TRS resource sets as compared to the second SIB. The first SIB may configure TRS resource sets #1 and #2, whereas the second SIB may configure TRS resource sets #3 and #4. The first UE may only receive, via the serving beam of the first UE, the SIB that indicates the subset of TRS resource sets that corresponds to the first UE. The first UE may not receive a SIB that indicates a subset of TRS resource sets that corresponds to the second UE. In some aspects, the SIB may further configure an ID (or group ID) associated with each TRS resource set included in the subset of TRS resource sets. The subset of TRS resource sets indicated in the SIB may also indicate TRS resource sets reserved/used in one or multiple neighbor beams. For example, the first SIB transmitted using the first beam may configure TRS resource sets #1, #2, #3, and #4, whereas the second SIB transmitted using the second beam may configure TRS resource sets #1, #2, #3, #4, #5, and #6.

In some aspects, the first UE may receive, via the SIB, the TRS resource set configuration that indicates the plurality of TRS resource sets. The plurality of TRS resource sets may be associated with the plurality of beams in the cell. The subset of TRS resource sets may be based at least in part on a serving beam of the first UE of the plurality of beams. In some aspects, the SIB transmitted by the network node may indicate TRS resource sets associated with each beam. The SIB transmitted by each beam may indicate an association between the beam and a TRS resource set. After receiving the SIB, the first UE may determine the subset of TRS resource sets based on its serving beam and/or the one or multiple neighbor beam(s) around its serving beam. Further, the SIB may associate an ID (or group ID) to each of the TRS resource sets, where the first UE may determine the ID accordingly.

As an example, the SIB may indicate that a first beam is associated with TRS resource sets #1 and #2, a second beam is associated with TRS resource sets #3 and #4, and a third beam is associated with TRS resource sets #5 and #6. Further, the SIB may indicate that TRS resource sets #1 and #2 are associated with IDs (or group IDs) 1 and 2, TRS resource sets #3 and #4 are associated with IDs (or group IDs) 3 and 4, and TRS resource sets #5 and #6 are associated with IDs (or group IDs) 5 and 6.

In some aspects, the first UE may receive, from the network node, the indication of the subset of TRS resource sets, including the TRS resource sets whose TRS are transmitted via one or more neighbor beams. The subset of TRS resource sets may be configured by the network node and/or determined by the first UE based at least in part on the one or more neighbor beams in proximity to (or around) the first UE's serving beam, and based at least in part on one or more indications of subsets of TRS resource sets transmitted over the one or more neighbor beams. The usage of the one or more neighbor beams may provide better support for the first UE on a boundary of two beams, for example, due to the first UE's and/or a satellite's movements. As an example, a first beam may be associated with TRS resource sets #1, #2, #3 and #4 of a first subset, a second beam may be associated with TRS resource sets #1, #2, #3, #4, #5, and #6 of a second subset, and a third beam may be associated with TRS resource sets #3, #4, #5 and #6 of a third subset. As a result, TRS resource sets transmitted over neighbor beams may be considered by the first UE when determining the subset of TRS resource sets.

In some aspects, the first UE may receive, from the network node, assistance information that indicates the one or more neighbor beams, where the subset of TRS resource sets may be based at least in part on the assistance information. In some aspects, the network node may provide the assistance information for the first UE to determine relevant neighbor beams, which may then be used by the first UE to determine the subset of TRS resource sets transmitted over the neighbor beams. For example, the network node may transmit an indication regarding angles, directions, and/or footprints of the plurality of beams. The first UE may calculate the neighbor beams relative to the serving beam based at least in part on the indication, and the first UE may determine the subset of TRS resource sets accordingly.

In some aspects, the first UE may determine the subset of TRS resource sets based at least in part on a rule preconfigured at the first UE and/or the network node, or based at least in part on a rule configured by the network node. As a result, the first UE and the network node may determine the same subset of TRS resource sets and/or the corresponding IDs (or group IDs). For example, the rule may be used to determine the neighbor beams, where the TRS resource sets associated with the neighbor beams may be considered by the first UE when determining the subset of TRS resource sets.

As shown by reference number 806, the first UE (and optionally, the second UE) may receive, from the network node, the TRS availability indication bitmap. The TRS availability indication bitmap may indicate an availability of a TRS (or multiple TRSs) associated with the subset of TRS resource sets. A bit in the TRS availability indication bitmap may indicate whether the TRS is available or not.

As an example, the first UE may receive, from the network node, a first TRS availability indication bitmap. The first TRS availability indication bitmap may indicate an availability of TRSs associated with the first subset of TRS resource sets (e.g., resource set #1 and resource set #2). The second UE may receive, from the network node, a second TRS availability indication bitmap. The second TRS availability indication bitmap may indicate an availability of TRSs associated with the second subset of TRS resource sets (e.g., resource set #3 and resource set #4).

As shown by reference number 808, the first UE (and optionally, the second UE) may determine that the TRS is available based at least in part on the TRS availability indication bitmap. The TRS availability indication bitmap may indicate, via the bit, the availability of the TRS associated with the subset of TRS resource sets. In some cases, the bit may indicate that one or multiple TRSs associated with the subset of TRS resource sets are available.

In some aspects, the first UE may receive the TRS availability indication bitmap, which may only indicate the availability of the TRS that is associated with the subset of TRS resource sets. In other words, the TRS availability indication bitmap may only indicate the availability of the TRS belonging to the subset of the TRS resource sets. The TRS availability indication bitmap may indicate available TRSs that are associated with the subset of the TRS resource sets. As an example, the TRS availability indication bitmap may only indicate availability information of the M TRS resource sets to the first UE, and availability information of the other (N-M) TRS resource sets may not be indicated by the TRS availability indication bitmap, since the other (N-M) TRS resource sets are not relevant for the first UE. Thus, each bit in the TRS availability indication bitmap may indicate a smaller quantity of TRS resource sets with a finer granularity, as compared to a legacy design. In some aspects, the first UE may determine the available TRSs based at least in part on the TRS availability indication bitmap and the subset of TRS resource sets. For example, a bit i in the TRS availability indication bitmap may indicate whether a TRS belonging to an ID i (or group ID i) is available or not.

As shown by reference number 810, the first UE (and optionally, the second UE) may receive, from the network node, the TRS based at least in part on the TRS availability indication bitmap indicating that the TRS is available. The TRS that is available is associated with the subset of TRS resource sets.

As shown by reference number 812, the first UE (and optionally, the second UE) may perform a function using the TRS received from the network node. The function may include an AGC, a time tracking, and/or a frequency tracking. In other words, the first UE may utilize the available TRSs for performing AGC, time and/or frequency tracking, and/or other applicable functions.

In some aspects, the first UE may receive, from the network node, an indication of a new subset of TRS resource sets from a plurality of TRS resource sets based at least in part on a selection of a new beam in a same cell or a different cell, in relation to the cell associated with the plurality of beams. When the first UE moves to or selects the new beam in the same or different cell, the first UE may read a SIB indicating a TRS resource set configuration from the new beam and/or determine the new subset of the TRS resource sets. In some aspects, the first UE may move to or select the new beam in the same or different cell, and the UE may determine the new subset of the TRS resource sets based at least in part on the plurality of TRS resource sets associated with the different beams and its new serving beam, camping beam, and/or neighbor beam(s).

In some aspects, different UEs may be configured to monitor different TRS resource sets. Each UE may be configured with a distinct TRS resource set. A bitmap, such as the TRS availability indication bitmap, may be transmitted in a physical downlink control channel (PDCCH), e.g., in a form of PEI and/or paging PDCCH and may indicate an availability of a TRS for each resource set for that UE. Since configured TRS resource sets for the different UEs may be distinct, after receiving the bitmap by the different UEs, each UE may determine potentially different TRS resource sets.

As indicated above, FIG. 8 is provided as an example. Other examples may differ from what is described with regard to FIG. 8.

Figure 9:
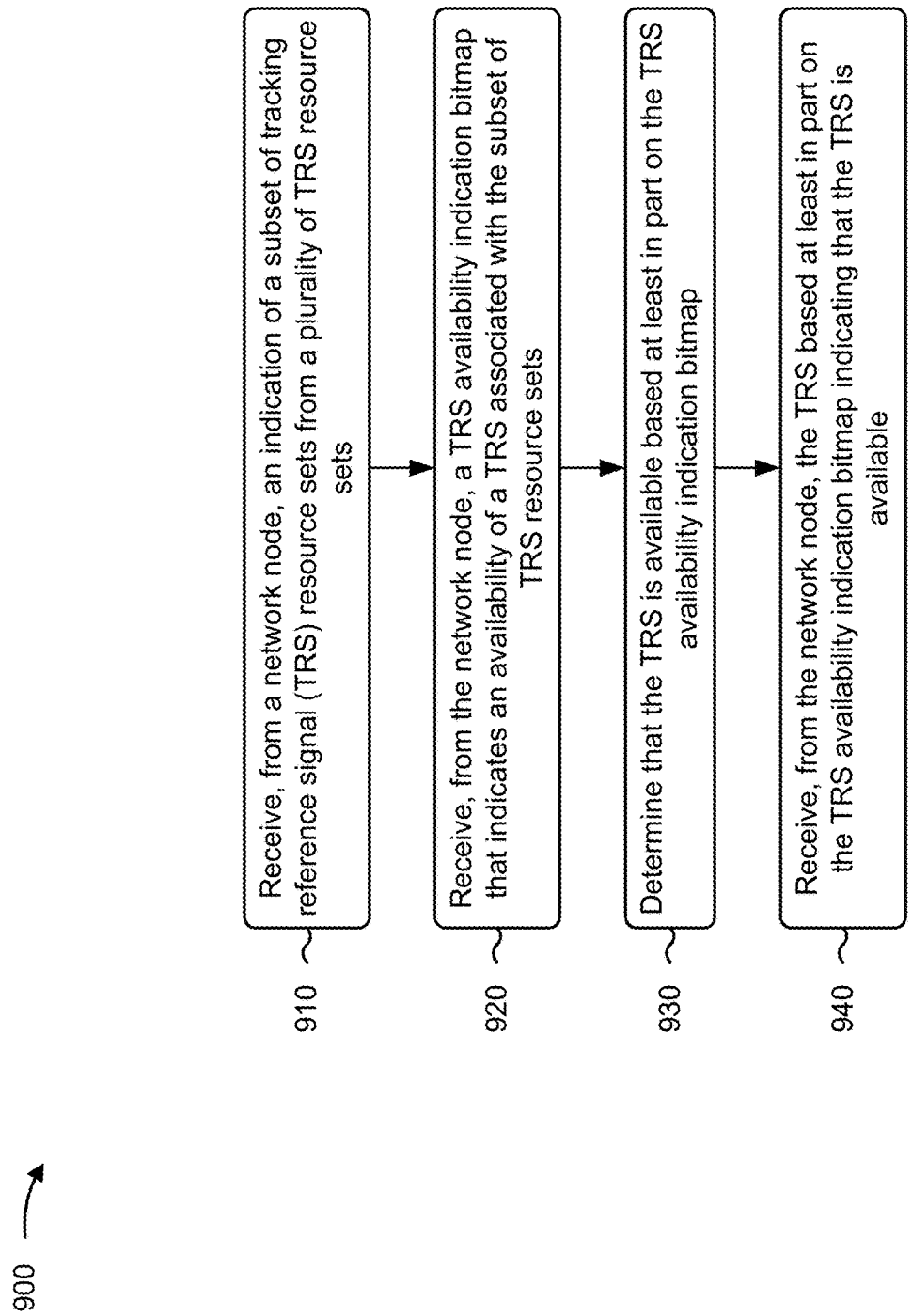
FIGS. 9-10 are diagrams illustrating example processes associated with indicating an availability of a TRS associated with a subset of TRS resource sets, in accordance with the present disclosure.

FIG. 9 is a diagram illustrating an example process 900 performed, for example, by a UE, in accordance with the present disclosure. Example process 900 is an example where the UE (e.g., UE 120) performs operations associated with indicating an availability of a TRS associated with a subset of TRS resource sets.

As shown in FIG. 9, in some aspects, process 900 may include receiving, from a network node, an indication of a subset of TRS resource sets from a plurality of TRS resource sets (block 910). For example, the UE (e.g., using communication manager 140 and/or reception component 1102, depicted in FIG. 11) may receive, from a network node, an indication of a subset of TRS resource sets from a plurality of TRS resource sets, as described above in connection with FIGS. 7-8.

As further shown in FIG. 9, in some aspects, process 900 may include receiving, from the network node, a TRS availability indication bitmap that indicates an availability of a TRS associated with the subset of TRS resource sets (block 920). For example, the UE (e.g., using communication manager 140 and/or reception component 1102, depicted in FIG. 11) may receive, from the network node, a TRS availability indication bitmap that indicates an availability of a TRS associated with the subset of TRS resource sets, as described above in connection with FIGS. 7-8.

As further shown in FIG. 9, in some aspects, process 900 may include determining that the TRS is available based at least in part on the TRS availability indication bitmap (block 930). For example, the UE (e.g., using communication manager 140 and/or determination component 1108, depicted in FIG. 11) may determine that the TRS is available based at least in part on the TRS availability indication bitmap, as described above in connection with FIGS. 7-8.

As further shown in FIG. 9, in some aspects, process 900 may include receiving, from the network node, the TRS based at least in part on the TRS availability indication bitmap indicating that the TRS is available (block 940). For example, the UE (e.g., using communication manager 140 and/or reception component 1102, depicted in FIG. 11) may receive, from the network node, the TRS based at least in part on the TRS availability indication bitmap indicating that the TRS is available, as described above in connection with FIGS. 7-8.

Process 900 may include additional aspects, such as any single aspect or any combination of aspects described below and/or in connection with one or more other processes described elsewhere herein.

In a first aspect, process 900 includes receiving, from the network node via a SIB, a TRS resource set configuration that indicates the plurality of TRS resource sets, wherein the plurality of TRS resource sets are associated with a plurality of beams in a cell.

In a second aspect, alone or in combination with the first aspect, the subset of TRS resource sets is based at least in part on a serving beam, of the UE, and the plurality of TRS resource sets associated with the plurality of beams in the cell.

In a third aspect, alone or in combination with one or more of the first and second aspects, a bit in the TRS availability indication bitmap indicates that one or multiple TRSs associated with the subset of TRS resource sets are available.

In a fourth aspect, alone or in combination with one or more of the first through third aspects, process 900 includes performing a function using the TRS received from the network node, wherein the function is at least one of: an automatic gain control, a time tracking, or a frequency tracking.

In a fifth aspect, alone or in combination with one or more of the first through fourth aspects, a TRS resource set of the subset of TRS resource sets is associated with an identifier.

In a sixth aspect, alone or in combination with one or more of the first through fifth aspects, the subset of TRS resource sets are based at least in part on one or multiple beams that are associated with the UE, wherein the one or multiple beams contain at least one of: a serving beam of the UE, a camping beam of the UE, one or multiple neighbor beams of the serving beam, or one or multiple neighbor beams of the camping beam.

In a seventh aspect, alone or in combination with one or more of the first through sixth aspects, process 900 includes receiving, from the network node, assistance information that indicates the one or multiple neighbor beams, wherein the subset of TRS resource sets are based at least in part on the assistance information.

In an eighth aspect, alone or in combination with one or more of the first through seventh aspects, process 900 includes receiving, from the network node via a serving beam associated with the UE, a SIB that indicates the subset of TRS resource sets, wherein the SIB is specific to the serving beam associated with the UE and is not associated with non-serving beams of the UE.

In a ninth aspect, alone or in combination with one or more of the first through eighth aspects, process 900 includes receiving, from the network node, an indication of a new subset of TRS resource sets from a plurality of TRS resource sets based at least in part on a selection of a new beam.

In a tenth aspect, alone or in combination with one or more of the first through ninth aspects, the UE is an RRC idle UE or an RRC inactive UE.

In an eleventh aspect, alone or in combination with one or more of the first through tenth aspects, the UE and the network node are included in a non-terrestrial network.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
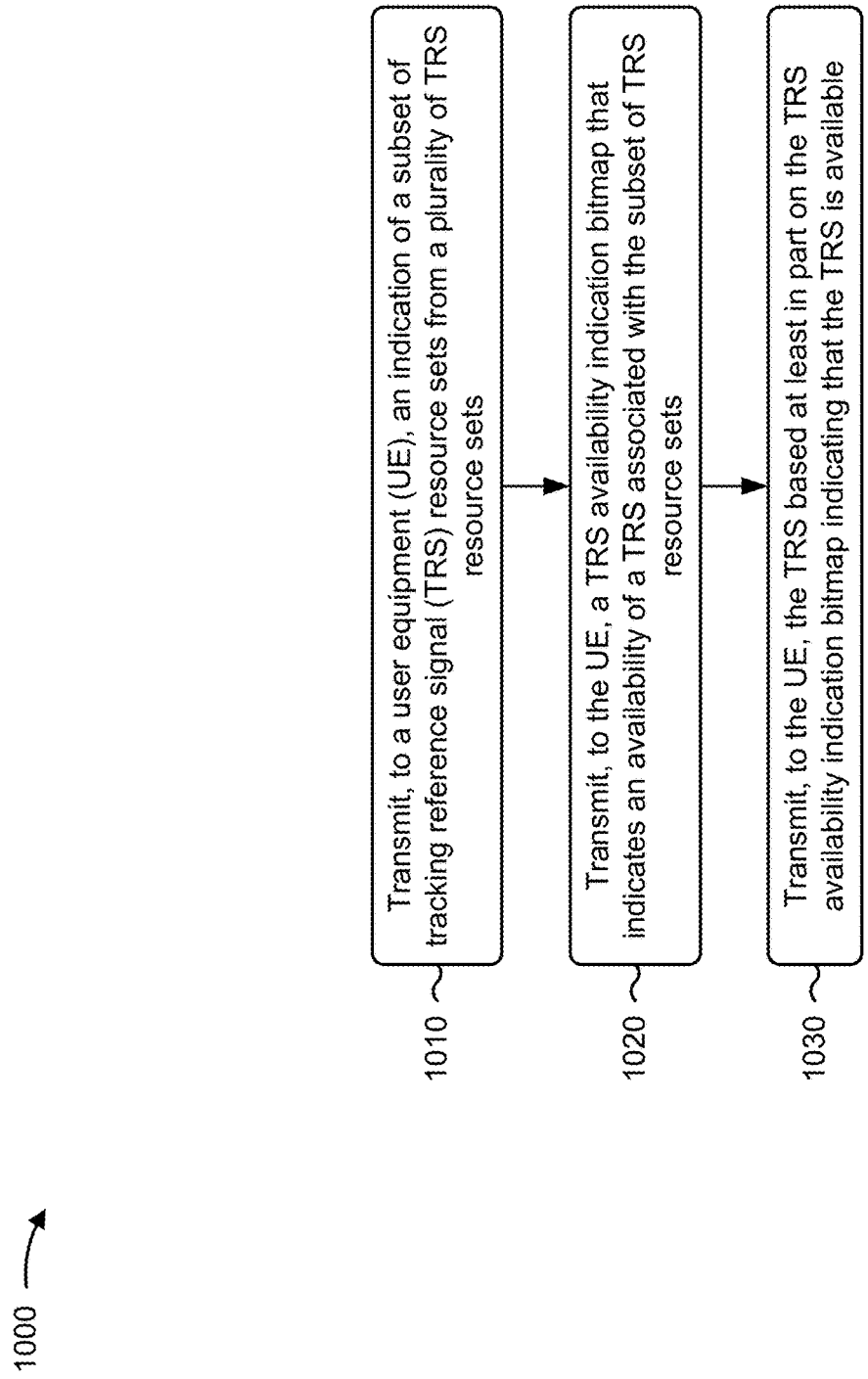

FIG. 10 is a diagram illustrating an example process 1000 performed, for example, by a network node, in accordance with the present disclosure. Example process 1000 is an example where the network node (e.g., network node 110) performs operations associated with indicating an availability of a TRS associated with a subset of TRS resource sets.

As shown in FIG. 10, in some aspects, process 1000 may include transmitting, to a UE, an indication of a subset of TRS resource sets from a plurality of TRS resource sets (block 1010). For example, the network node (e.g., using transmission component 1204, depicted in FIG. 12) may transmit, to a UE, an indication of a subset of TRS resource sets from a plurality of TRS resource sets, as described above in connection with FIGS. 7-8.

As further shown in FIG. 10, in some aspects, process 1000 may include transmitting, to the UE, a TRS availability indication bitmap that indicates an availability of a TRS associated with the subset of TRS resource sets (block 1020). For example, the network node (e.g., using transmission component 1204, depicted in FIG. 12) may transmit, to the UE, a TRS availability indication bitmap that indicates an availability of a TRS associated with the subset of TRS resource sets, as described above in connection with FIGS. 7-8.

As further shown in FIG. 10, in some aspects, process 1000 may include transmitting, to the UE, the TRS based at least in part on the TRS availability indication bitmap indicating that the TRS is available (block 1030). For example, the network node (e.g., using transmission component 1204, depicted in FIG. 12) may transmit, to the UE, the TRS based at least in part on the TRS availability indication bitmap indicating that the TRS is available, as described above in connection with FIGS. 7-8.

Process 1000 may include additional aspects, such as any single aspect or any combination of aspects described below and/or in connection with one or more other processes described elsewhere herein.

In a first aspect, process 1000 includes transmitting, to the UE via a SIB, a TRS resource set configuration that indicates the plurality of TRS resource sets, wherein the plurality of TRS resource sets are associated with a plurality of beams in a cell.

In a second aspect, alone or in combination with the first aspect, process 1000 includes transmitting a configuration that configures different subsets of TRS resource sets for different beams of a plurality of beams in a cell.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
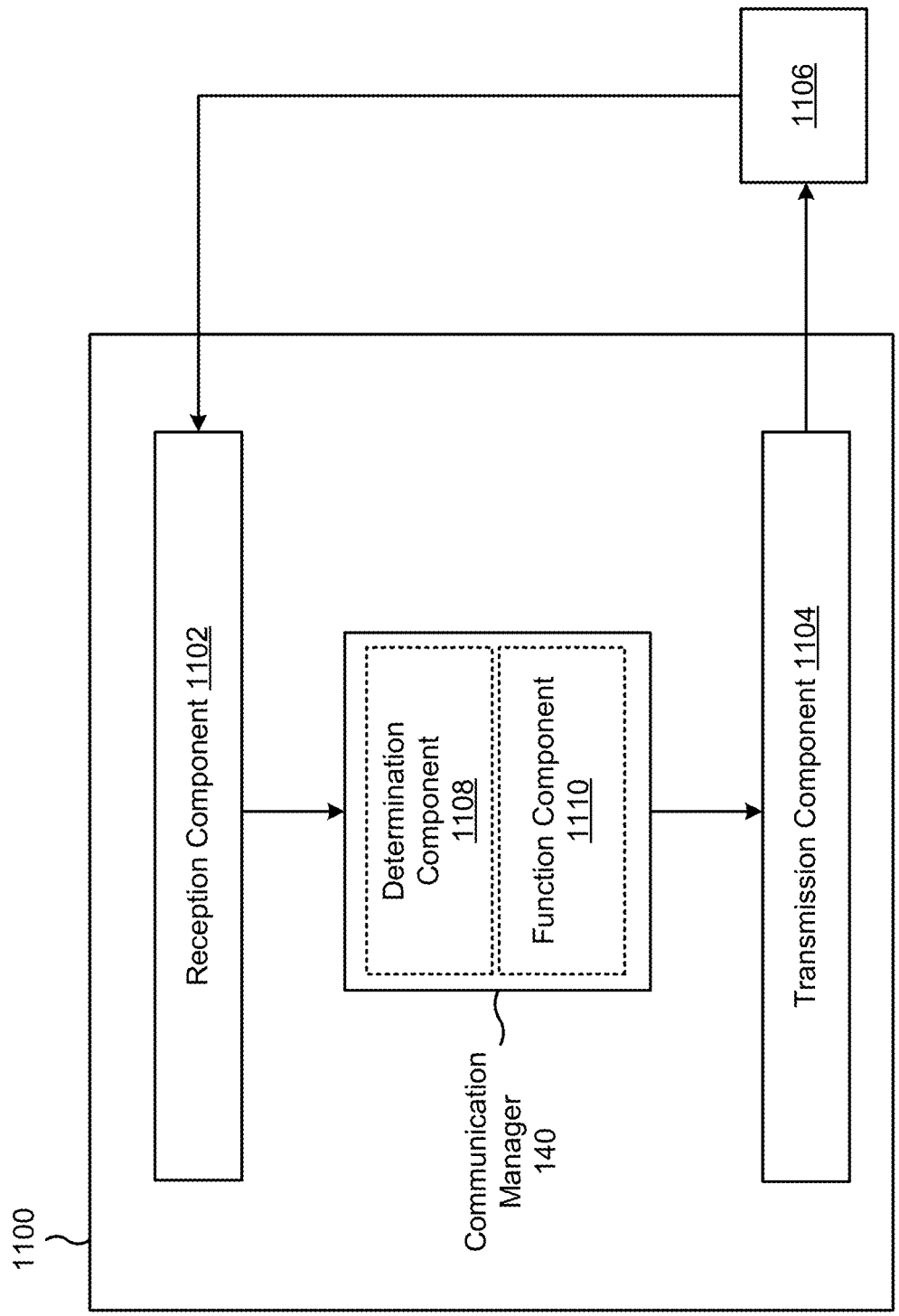
FIGS. 11-12 are diagrams of example apparatuses for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of a determination component 1108, or a function component 1110, among other examples.

In some aspects, the apparatus 1100 may be configured to perform one or more operations described herein in connection with FIGS. 7-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive, from a network node, an indication of a subset of TRS resource sets from a plurality of TRS resource sets. The reception component 1102 may receive, from the network node, a TRS availability indication bitmap that indicates an availability of a TRS associated with the subset of TRS resource sets. The determination component 1108 may determine that the TRS is available based at least in part on the TRS availability indication bitmap. The reception component 1102 may receive, from the network node, the TRS based at least in part on the TRS availability indication bitmap indicating that the TRS is available.

The reception component 1102 may receive, from the network node via a SIB, a TRS resource set configuration that indicates the plurality of TRS resource sets, wherein the plurality of TRS resource sets are associated with a plurality of beams in a cell. The function component 1110 may perform a function using the TRS received from the network node, wherein the function is at least one of: an automatic gain control, a time tracking, or a frequency tracking. The reception component 1102 may receive, from the network node, assistance information that indicates the one or multiple neighbor beams, wherein the subset of TRS resource sets are based at least in part on the assistance information. The reception component 1102 may receive, from the network node, an indication of a new subset of TRS resource sets from a plurality of TRS resource sets based at least in part on a selection of a new beam.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
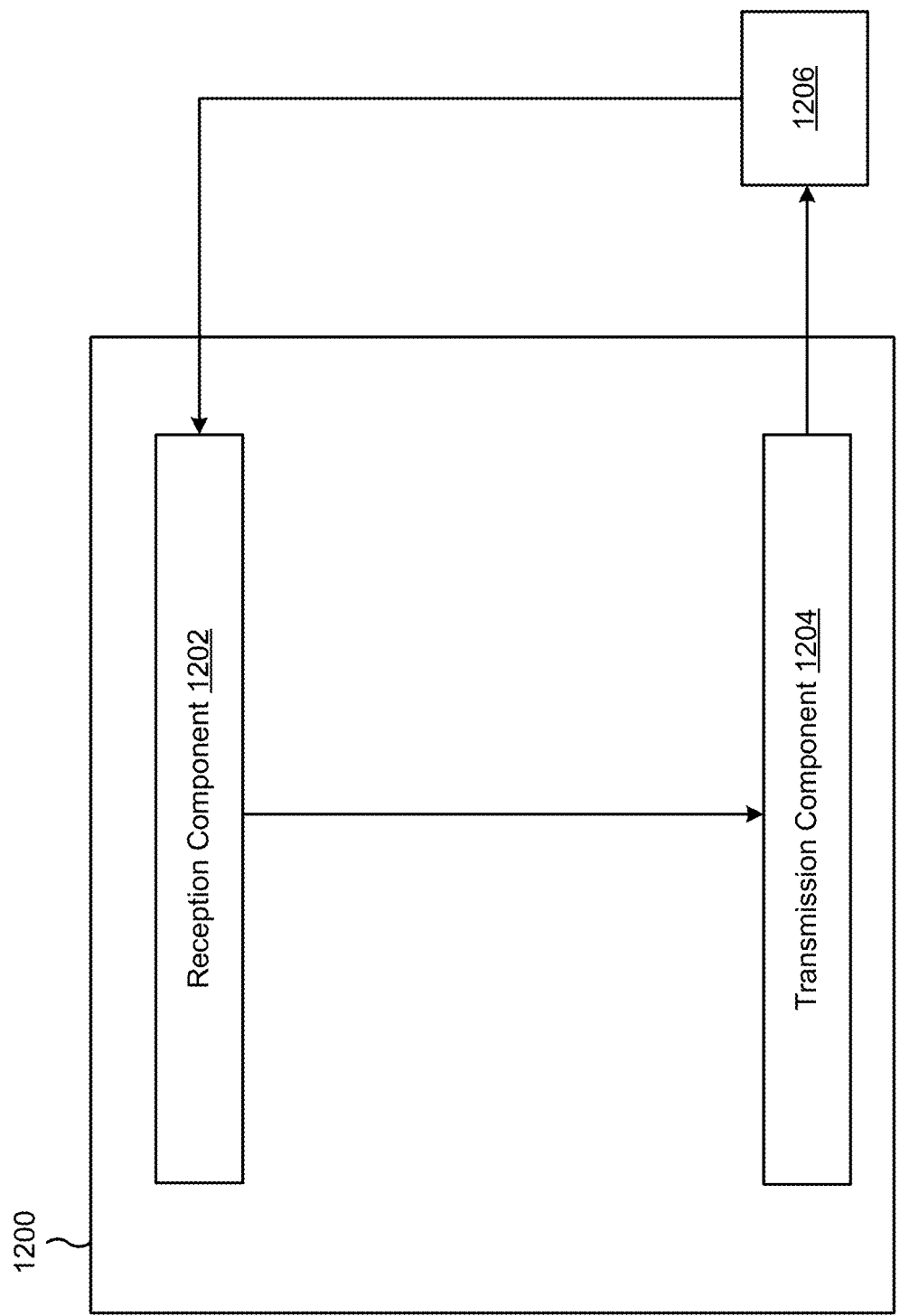

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204.

In some aspects, the apparatus 1200 may be configured to perform one or more operations described herein in connection with FIGS. 7-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The transmission component 1204 may transmit, to a UE, an indication of a subset of TRS resource sets from a plurality of TRS resource sets. The transmission component 1204 may transmit, to the UE, a TRS availability indication bitmap that indicates an availability of a TRS associated with the subset of TRS resource sets. The transmission component 1204 may transmit, to the UE, the TRS based at least in part on the TRS availability indication bitmap indicating that the TRS is available.

The transmission component 1204 may transmit, to the UE via a SIB, a TRS resource set configuration that indicates the plurality of TRS resource sets, wherein the plurality of TRS resource sets are associated with a plurality of beams in a cell. The transmission component 1204 may transmit a configuration that configures different subsets of TRS resource sets for different beams of a plurality of beams in a cell.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, from a network node, an indication of a subset of tracking reference signal (TRS) resource sets from a plurality of TRS resource sets; receiving, from the network node, a TRS availability indication bitmap that indicates an availability of a TRS associated with the subset of TRS resource sets; determining that the TRS is available based at least in part on the TRS availability indication bitmap; and receiving, from the network node, the TRS based at least in part on the TRS availability indication bitmap indicating that the TRS is available.

Aspect 2: The method of Aspect 1, further comprising: receiving, from the network node via a system information block, a TRS resource set configuration that indicates the plurality of TRS resource sets, wherein the plurality of TRS resource sets are associated with a plurality of beams in a cell.

Aspect 3: The method of Aspect 2, wherein the subset of TRS resource sets is based at least in part on a serving beam, of the UE, and the plurality of TRS resource sets associated with the plurality of beams in the cell.

Aspect 4: The method of any of Aspects 1 through 3, wherein a bit in the TRS availability indication bitmap indicates that one or multiple TRSs associated with the subset of TRS resource sets are available.

Aspect 5: The method of any of Aspects 1 through 4, further comprising: performing a function using the TRS received from the network node, wherein the function is at least one of: an automatic gain control, a time tracking, or a frequency tracking.

Aspect 6: The method of any of Aspects 1 through 5, wherein a TRS resource set of the subset of TRS resource sets is associated with an identifier.

Aspect 7: The method of any of Aspects 1 through 6, wherein the subset of TRS resource sets are based at least in part on one or multiple beams that are associated with the UE, wherein the one or multiple beams contain at least one of: a serving beam of the UE, a camping beam of the UE, one or multiple neighbor beams of the serving beam, or one or multiple neighbor beams of the camping beam.

Aspect 8: The method of Aspect 7, further comprising: receiving, from the network node, assistance information that indicates the one or multiple neighbor beams, wherein the subset of TRS resource sets are based at least in part on the assistance information.

Aspect 9: The method of any of Aspects 1 through 8, wherein receiving the indication of the subset of TRS resource sets comprises: receiving, from the network node via a serving beam associated with the UE, a system information block (SIB) that indicates the subset of TRS resource sets, wherein the SIB is specific to the serving beam associated with the UE and is not associated with non-serving beams of the UE.

Aspect 10: The method of any of Aspects 1 through 9, further comprising: receiving, from the network node, an indication of a new subset of TRS resource sets from a plurality of TRS resource sets based at least in part on a selection of a new beam.

Aspect 11: The method of any of Aspects 1 through 10, wherein the UE is a radio resource control (RRC) idle UE or an RRC inactive UE.

Aspect 12: The method of any of Aspects 1 through 11, wherein the UE and the network node are included in a non-terrestrial network.

Aspect 13: A method of wireless communication performed by a network node, comprising: transmitting, to a user equipment (UE), an indication of a subset of tracking reference signal (TRS) resource sets from a plurality of TRS resource sets; transmitting, to the UE, a TRS availability indication bitmap that indicates an availability of a TRS associated with the subset of TRS resource sets; and transmitting, to the UE, the TRS based at least in part on the TRS availability indication bitmap indicating that the TRS is available.

Aspect 14: The method of Aspect 13, further comprising: transmitting, to the UE via a system information block, a TRS resource set configuration that indicates the plurality of TRS resource sets, wherein the plurality of TRS resource sets are associated with a plurality of beams in a cell.

Aspect 15: The method of any of Aspects 13 through 14, further comprising: transmitting a configuration that configures different subsets of TRS resource sets for different beams of a plurality of beams in a cell.

Aspect 16: An apparatus for wireless communication at a device, comprising a processor; memory coupled with the processor; and instructions stored in the memory and executable by the processor to cause the apparatus to perform the method of one or more of Aspects 1-12.

Aspect 17: A device for wireless communication, comprising a memory and one or more processors coupled to the memory, the one or more processors configured to perform the method of one or more of Aspects 1-12.

Aspect 18: An apparatus for wireless communication, comprising at least one means for performing the method of one or more of Aspects 1-12.

Aspect 19: A non-transitory computer-readable medium storing code for wireless communication, the code comprising instructions executable by a processor to perform the method of one or more of Aspects 1-12.

Aspect 20: A non-transitory computer-readable medium storing a set of instructions for wireless communication, the set of instructions comprising one or more instructions that, when executed by one or more processors of a device, cause the device to perform the method of one or more of Aspects 1-12.

Aspect 21: An apparatus for wireless communication at a device, comprising a processor; memory coupled with the processor; and instructions stored in the memory and executable by the processor to cause the apparatus to perform the method of one or more of Aspects 13-15.

Aspect 22: A device for wireless communication, comprising a memory and one or more processors coupled to the memory, the one or more processors configured to perform the method of one or more of Aspects 13-15.

Aspect 23: An apparatus for wireless communication, comprising at least one means for performing the method of one or more of Aspects 13-15.

Aspect 24: A non-transitory computer-readable medium storing code for wireless communication, the code comprising instructions executable by a processor to perform the method of one or more of Aspects 13-15.

Aspect 25: A non-transitory computer-readable medium storing a set of instructions for wireless communication, the set of instructions comprising one or more instructions that, when executed by one or more processors of a device, cause the device to perform the method of one or more of Aspects 13-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   memory; and
   one or more processors, coupled to the memory, configured to:
   receive, from a network node, an indication of a subset of M tracking reference signal (TRS) resource sets from a plurality of N TRS resource sets, wherein M is less than N and wherein remaining N-M of the plurality of TRS resource sets, other than the subset of TRS resource sets, are not configured for the UE;
   receive, from the network node, a TRS availability indication bitmap that indicates an availability of a TRS associated with the subset of TRS resource sets;
   determine that the TRS is available based at least in part on the TRS availability indication bitmap; and
   receive, from the network node, the TRS based at least in part on the TRS availability indication bitmap indicating that the TRS is available.

2. The apparatus of claim 1, wherein the one or more processors are further configured to:
   receive, from the network node via a system information block, a TRS resource set configuration that indicates the plurality of TRS resource sets, wherein the plurality of TRS resource sets are associated with a plurality of beams in a cell.

3. The apparatus of claim 2, wherein the subset of TRS resource sets is based at least in part on a serving beam, of the UE, and the plurality of TRS resource sets associated with the plurality of beams in the cell.

4. The apparatus of claim 1, wherein a bit in the TRS availability indication bitmap indicates that one or multiple TRSs associated with the subset of TRS resource sets are available.

5. The apparatus of claim 1, wherein the one or more processors are further configured to:
   perform a function using the TRS received from the network node, wherein the function is at least one of: an automatic gain control, a time tracking, or a frequency tracking.

6. The apparatus of claim 1, wherein a TRS resource set of the subset of TRS resource sets is associated with an identifier.

7. The apparatus of claim 1, wherein the subset of TRS resource sets are based at least in part on one or multiple beams that are associated with the UE, wherein the one or multiple beams contain at least one of: a serving beam of the UE, a camping beam of the UE, one or multiple neighbor beams of the serving beam, or one or multiple neighbor beams of the camping beam.

8. The apparatus of claim 7, wherein the one or more processors are further configured to:
   receive, from the network node, assistance information that indicates the one or multiple neighbor beams, wherein the subset of TRS resource sets are based at least in part on the assistance information.

9. The apparatus of claim 1, wherein the one or more processors, to receive the indication of the subset of TRS resource sets, are configured to receive, from the network node via a serving beam associated with the UE, a system information block (SIB) that indicates the subset of TRS resource sets, wherein the SIB is specific to the serving beam associated with the UE and is not associated with non-serving beams of the UE.

10. The apparatus of claim 1, wherein the one or more processors are further configured to:
    receive, from the network node, an indication of a new subset of TRS resource sets from a plurality of TRS resource sets based at least in part on a selection of a new beam.

11. The apparatus of claim 1, wherein the UE is a radio resource control (RRC) idle UE or an RRC inactive UE.

12. The apparatus of claim 1, wherein the UE and the network node are included in a non-terrestrial network.

13. An apparatus for wireless communication at a network node, comprising:
   memory; and
   one or more processors, coupled to the memory, configured to:
      transmit, to a user equipment (UE), an indication of a subset M of tracking reference signal (TRS) resource sets from a plurality of N TRS resource sets, wherein M is less than N and wherein remaining N-M of the plurality of TRS resource sets, other than the subset of TRS resource sets, are not configured for the UE;
      transmit, to the UE, a TRS availability indication bitmap that indicates an availability of a TRS associated with the subset of TRS resource sets; and
      transmit, to the UE, the TRS based at least in part on the TRS availability indication bitmap indicating that the TRS is available.

14. The apparatus of claim 13, wherein the one or more processors are further configured to:
   transmit, to the UE via a system information block, a TRS resource set configuration that indicates the plurality of TRS resource sets, wherein the plurality of TRS resource sets are associated with a plurality of beams in a cell.

15. The apparatus of claim 13, wherein the one or more processors are further configured to:
   transmit a configuration that configures different subsets of TRS resource sets for different beams of a plurality of beams in a cell.

16. A method of wireless communication performed by a user equipment (UE), comprising:
   receiving, from a network node, an indication of a subset of M tracking reference signal (TRS) resource sets from a plurality of N TRS resource sets, wherein M is less than N and wherein remaining N-M of the plurality of TRS resource sets, other than the subset of TRS resource sets, are not configured for the UE;
   receiving, from the network node, a TRS availability indication bitmap that indicates an availability of a TRS associated with the subset of TRS resource sets;
   determining that the TRS is available based at least in part on the TRS availability indication bitmap; and
   receiving, from the network node, the TRS based at least in part on the TRS availability indication bitmap indicating that the TRS is available.

17. The method of claim 16, further comprising:
   receiving, from the network node via a system information block, a TRS resource set configuration that indicates the plurality of TRS resource sets, wherein the plurality of TRS resource sets are associated with a plurality of beams in a cell.

18. The method of claim 17, wherein the subset of TRS resource sets is based at least in part on a serving beam, of the UE, and the plurality of TRS resource sets associated with the plurality of beams in the cell.

19. The method of claim 16, wherein a bit in the TRS availability indication bitmap indicates that one or multiple TRSs associated with the subset of TRS resource sets are available.

20. The method of claim 16, further comprising:
   performing a function using the TRS received from the network node, wherein the function is at least one of: an automatic gain control, a time tracking, or a frequency tracking.

21. The method of claim 16, wherein a TRS resource set of the subset of TRS resource sets is associated with an identifier.

22. The method of claim 16, wherein the subset of TRS resource sets are based at least in part on one or multiple beams that are associated with the UE, wherein the one or multiple beams contain at least one of: a serving beam of the UE, a camping beam of the UE, one or multiple neighbor beams of the serving beam, or one or multiple neighbor beams of the camping beam.

23. The method of claim 22, further comprising:
   receiving, from the network node, assistance information that indicates the one or multiple neighbor beams, wherein the subset of TRS resource sets are based at least in part on the assistance information.

24. The method of claim 16, wherein receiving the indication of the subset of TRS resource sets comprises:
   receiving, from the network node via a serving beam associated with the UE, a system information block (SIB) that indicates the subset of TRS resource sets, wherein the SIB is specific to the serving beam associated with the UE and is not associated with non-serving beams of the UE.

25. The method of claim 16, further comprising:
   receiving, from the network node, an indication of a new subset of TRS resource sets from a plurality of TRS resource sets based at least in part on a selection of a new beam.

26. The method of claim 16, wherein the UE is a radio resource control (RRC) idle UE or an RRC inactive UE.

27. The method of claim 16, wherein the UE and the network node are included in a non-terrestrial network.

28. A method of wireless communication performed by a network node, comprising:
   transmitting, to a user equipment (UE), an indication of a subset of M tracking reference signal (TRS) resource sets from a plurality of N TRS resource sets, wherein M is less than N and wherein remaining N-M of the plurality of TRS resource sets, other than the subset of TRS resource sets, are not configured for the UE;
   transmitting, to the UE, a TRS availability indication bitmap that indicates an availability of a TRS associated with the subset of TRS resource sets; and
   transmitting, to the UE, the TRS based at least in part on the TRS availability indication bitmap indicating that the TRS is available.

29. The method of claim 28, further comprising:
   transmitting, to the UE via a system information block, a TRS resource set configuration that indicates the plurality of TRS resource sets, wherein the plurality of TRS resource sets are associated with a plurality of beams in a cell.

30. The method of claim 28, further comprising:
   transmitting a configuration that configures different subsets of TRS resource sets for different beams of a plurality of beams in a cell.

* * * * *